United States Patent
Gandi et al.

(10) Patent No.: US 9,766,928 B1
(45) Date of Patent: Sep. 19, 2017

(54) RECYCLING TOOL USING SCRIPTS TO STOP MIDDLEWARE INSTANCES AND RESTART SERVICES AFTER SNAPSHOTS ARE TAKEN

(71) Applicant: Bank of America Corporation, Charlotte, NC (US)

(72) Inventors: Rama Krishna V. Gandi, Hyderabad (IN); Venkatesh Thiagarajan, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 15/075,893

(22) Filed: Mar. 21, 2016

(51) Int. Cl.
  *G06F 11/07* (2006.01)
  *G06F 9/48* (2006.01)
  *G06F 11/14* (2006.01)

(52) U.S. Cl.
  CPC .......... *G06F 9/485* (2013.01); *G06F 11/0709* (2013.01); *G06F 11/079* (2013.01); *G06F 11/0751* (2013.01); *G06F 11/0772* (2013.01); *G06F 11/1446* (2013.01); *G06F 11/1458* (2013.01); *G06F 11/1469* (2013.01)

(58) Field of Classification Search
  CPC ............... G06F 11/0709; G06F 11/079; G06F 11/1438; G06F 11/1441; G06F 11/1458; G06F 11/1469; G06F 11/1446
  See application file for complete search history.

(56) References Cited

U.S. PATENT DOCUMENTS

| | | | |
|---|---|---|---|
| 6,883,015 B1* | 4/2005 | Geen ...................... | G10L 15/30 703/23 |
| 2005/0240667 A1* | 10/2005 | Koegel .................. | G06Q 10/10 709/223 |
| 2007/0277056 A1* | 11/2007 | Varadarajan ........ | G06F 11/1438 714/15 |
| 2014/0068040 A1* | 3/2014 | Neti ........................ | G06F 9/485 709/223 |
| 2014/0181833 A1* | 6/2014 | Bird ...................... | G06F 9/5016 718/105 |

* cited by examiner

*Primary Examiner* — Joseph Schell
(74) *Attorney, Agent, or Firm* — Michael A. Springs

(57) ABSTRACT

A recycling tool includes a memory, a monitoring engine, a script execution engine, and a status check engine. The memory stores a stop script and a restart script. The monitoring engine receives a request to begin maintenance. The script execution engine executes the stop script to stop processes on middleware servers and databases. The status check engine determines that maintenance has completed. The script execution engine executes the restart script to restart processes on middleware servers and databases.

21 Claims, 3 Drawing Sheets

RECYCLING TOOL USING SCRIPTS TO STOP MIDDLEWARE INSTANCES AND RESTART SERVICES AFTER SNAPSHOTS ARE TAKEN

TECHNICAL FIELD

This disclosure relates generally to a system for recycling servers and databases.

BACKGROUND

Processes on databases and servers are typically stopped during database and server maintenance. After the maintenance is complete, these processes are restarted. As a result, maintenance can create security and corruption issues for databases and servers.

SUMMARY OF THE DISCLOSURE

According to one embodiment, a recycling tool includes a memory, a monitoring engine, a script execution engine, and a status check engine. The memory stores a stop script and a restart script. The monitoring engine receives a request to begin maintenance. The script execution engine executes the stop script in response to receiving the request. Executing the stop script causes the script execution engine to identify a first middleware instance executing on a first middleware server, stop the first middleware instance, identify a second middleware instance executing on a second middleware server, stop the second middleware instance, take a first snapshot of a first database, stop a first service, take a second snapshot of a second database, and stop a second service. The status check engine determines that maintenance has completed. The script execution engine executes the restart script in response to the determination that maintenance has completed. Executing the restart script causes the script execution engine to determine, based on the first snapshot, that the first service should be restarted on the first database, in response to the determination that the first service should be restarted on the first database, restart the first service on the first database, determine, based on the second snapshot, that the second service should be restarted on the second database, in response to the determination that the second service should be restarted on the second database, restart the second service on the second database, restart the first middleware instance on the first middleware server, and restart the second middleware instance on the second middleware server.

According to another embodiment, a method includes storing a stop script and a restart script and receiving a request to begin maintenance. The method further includes executing the stop script in response to receiving the request, identifying a first middleware instance executing on a first middleware server, and stopping the first middleware instance. The method also includes identifying a second middleware instance executing on a second middleware server and stopping the second middleware instance. The method further includes taking a first snapshot of a first database, wherein the first snapshot identifies a first service running on the first database and stopping the first service. The method also includes taking a second snapshot of a second database, wherein the second snapshot identifies a second service running on the second database and stopping the second service. The method further includes determining that maintenance has completed and executing the restart script in response to the determination that maintenance has completed. The method further includes determining, based on the first snapshot, that the first service should be restarted on the first database, in response to the determination that the first service should be restarted on the first database, restarting the first service on the first database, determining, based on the second snapshot, that the second service should be restarted on the second database, in response to the determination that the second service should be restarted on the second database, restarting the second service on the second database, restarting the first middleware instance on the first middleware server, and restarting the second middleware instance on the second middleware server.

According to another embodiment, a system includes a device, a first database, a second database, a first middle ware server, a second middleware server, and a recycling tool. The recycling tool stores a stop script and a restart script and receives a request to begin maintenance from the device. The recycling tool executes the stop script in response to receiving the request, identifies a first middleware instance executing on the first middleware server, and stops the first middleware instance. The recycling tool identifies a second middleware instance executing on the second middleware server and stops the second middleware instance. The recycling tool takes a first snapshot of the first database, wherein the first snapshot identifies a first service running on the first database and stops the first service. The recycling tool takes a second snapshot of the second database, wherein the second snapshot identifies a second service running on the second database and stops the second service. The recycling tool determines that maintenance has completed, executes the restart script in response to the determination that maintenance has completed, determines, based on the first snapshot, that the first service should be restarted on the first database, in response to the determination that the first service should be restarted on the first database, restarts the first service on the first database, determines, based on the second snapshot, that the second service should be restarted on the second database, in response to the determination that the second service should be restarted on the second database, restarts the second service on the second database, restarts the first middleware instance on the first middleware server, and restarts the second middleware instance on the second middleware server.

Certain embodiments provide one or more technical advantages. For example, an embodiment reduces the security risks from errors arising during the stopping and restart process on servers and databases. As another example, an embodiment prevents cache corruptions from overlapping stops and restarts. As yet another example, an embodiment prevents crashes during the stops and restarts arising from unbalanced loads. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
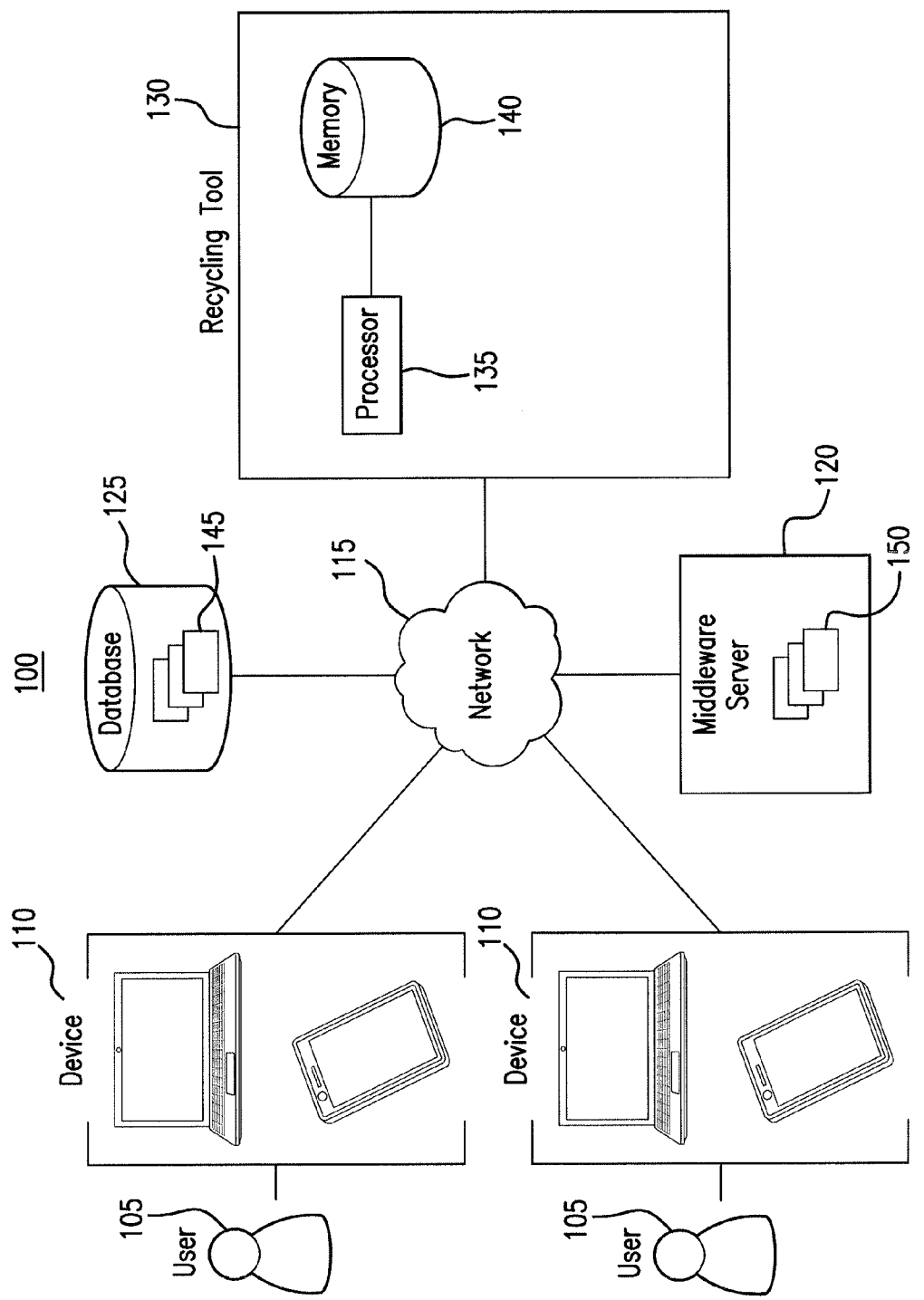
FIG. 1 illustrates a system for recycling databases and servers.
Figure 2:
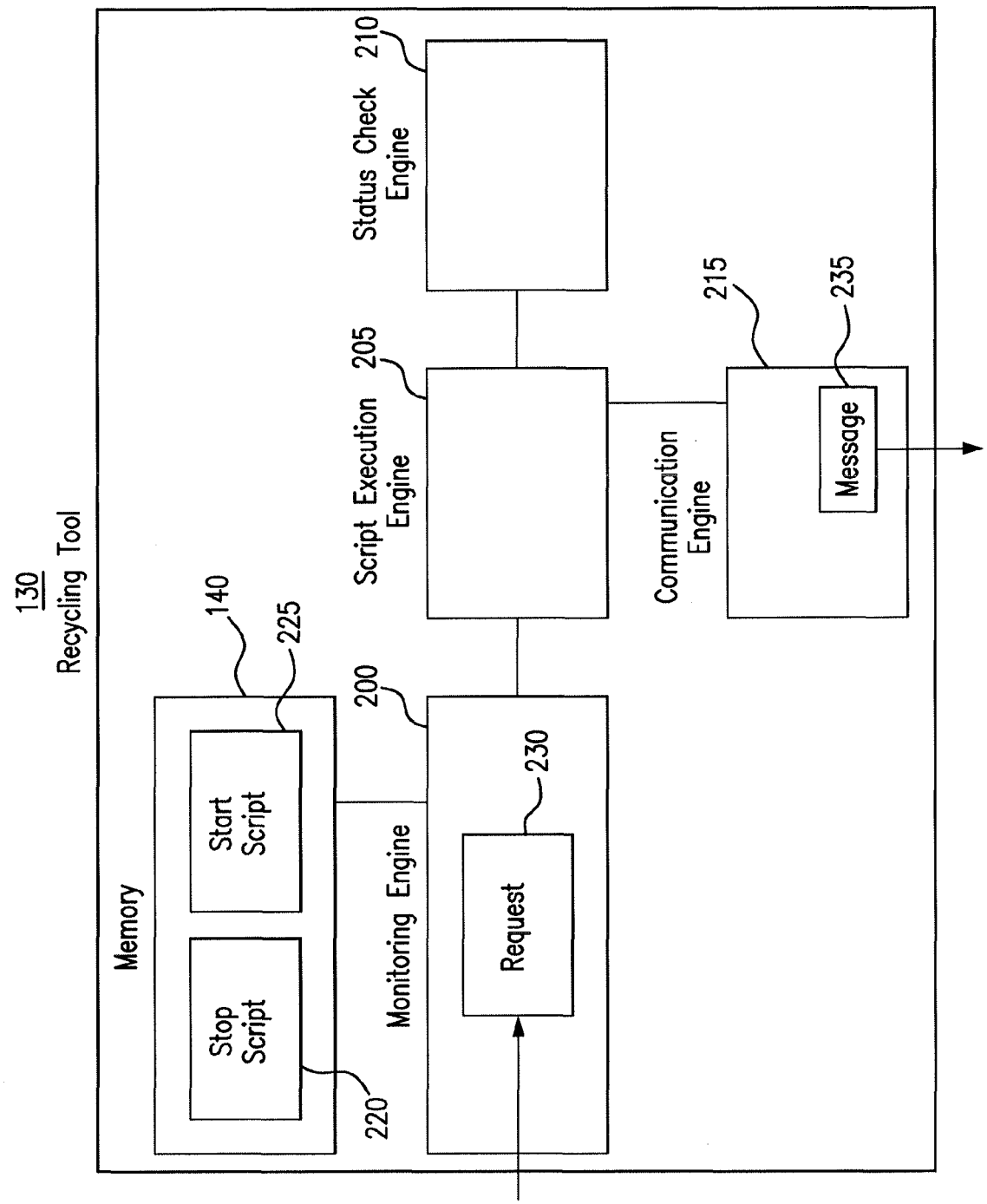
FIG. 2 illustrates the recycling tool of the system of FIG. 1.
Figure 3:
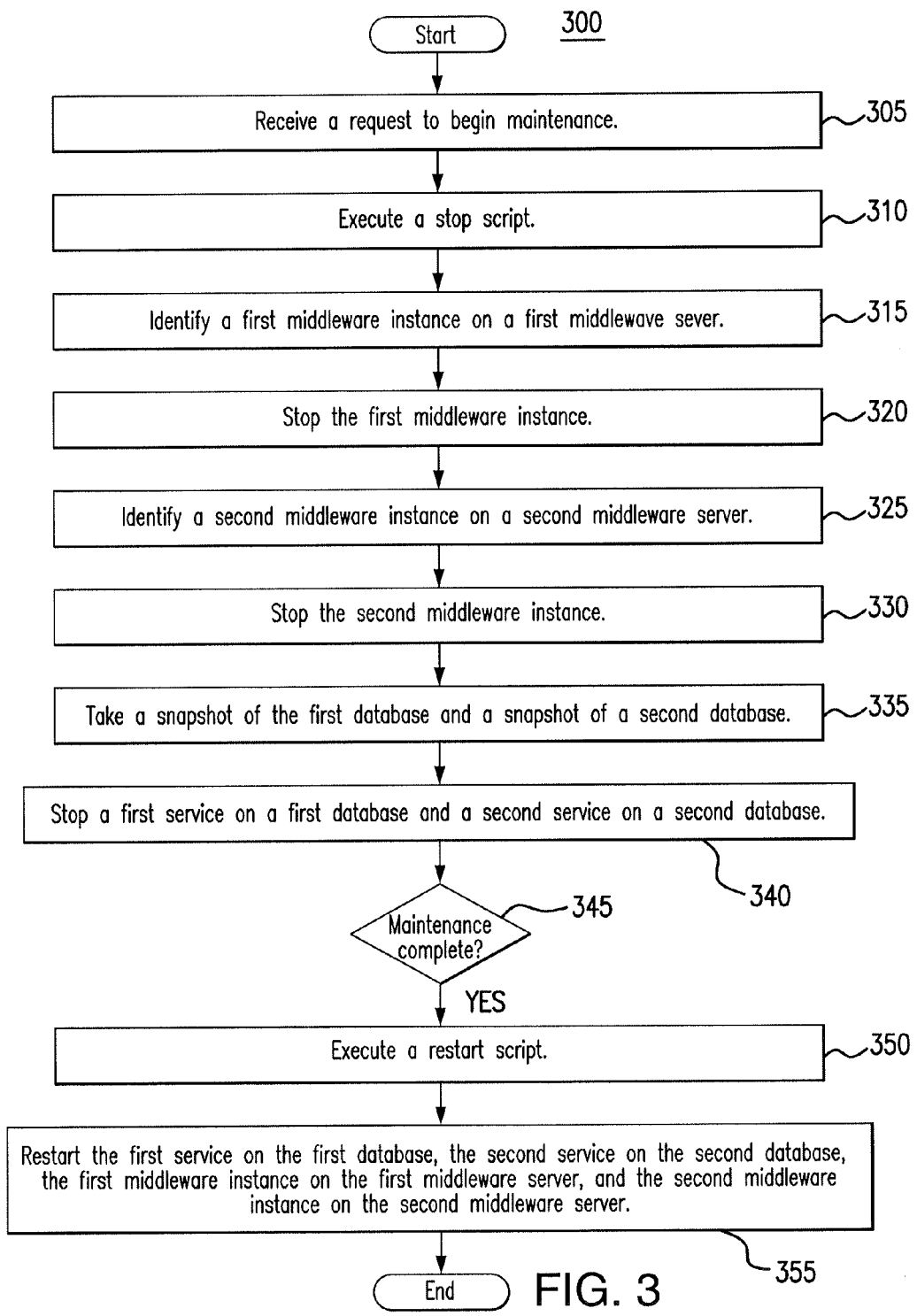
FIG. 3 is a flowchart illustrating a method for recycling databases and servers using the system of FIG. 1.

Embodiments of the present disclosure and its advantages are best understood by referring to FIGS. 1 through 3 of the drawings, like numerals being used for like and corresponding parts of the various drawings.

Databases and servers execute various processes to perform various tasks. Maintenance should be performed on these databases and servers to ensure that these databases and servers are functioning properly and securely. For example, maintenance can be performed to install security patches and/or update software on the databases and servers. As another example, maintenance can be performed to ensure that data on the databases and servers are not corrupted. Performing maintenance can increase the lifetime of the databases and servers.

Maintenance typically involves stopping certain processes on the databases and servers. After these processes are stopped, then maintenance such as patching and/or software updates can occur. After the maintenance is complete, the processes that were stopped can be restarted.

Stopping and restarting processes, particularly manual stops and restarts, introduce several issues that should be addressed. For example, manual stops and restarts often lead to errors that pose security threats. For example, manual stops and restarts may lead to inadvertent stops and/or inadvertent restarts of certain processes. When processes that should not be stopped are stopped, a security threat is posed. As another example, manual stops and restarts can be mistimed and/or overlapped, which may lead to data corruptions and other errors. When a first user stops a process and then restarts that process but a second user stops that process during the restart, then data and/or cache corruptions can occur. These data and cache corruptions can result in the database and server crashing. As yet another example, manual stops and restarts can cause unbalanced loads in other databases and servers. If the manual stops and restarts are not performed properly, then the other databases and servers can crash from the unbalanced loads.

This disclosure contemplates a recycling tool that stops and restarts processes on databases and servers. The recycling tool stops and restarts processes in such a manner that may reduce the chance for errors and security threats. The recycling tool monitors for maintenance windows and executes stop and restart scripts to stop and start processes. When a maintenance window is about to begin, the recycling tool executes the stop script to stop certain processes on databases and servers. After maintenance is complete, the recycling tool executes the restart script to restart the stopped processes on the databases and servers. In this manner, the recycling tool reduces the chance of overlapping stops and restarts and reduces the chance of unbalanced loads, data corruptions, and security threats arising from stops and restarts. The recycling tool will be discussed in more detail using FIGS. 1 through 3. FIG. 1 will describe the recycling tool generally. FIGS. 2 and 3 will describe the recycling tool in more detail.

FIG. 1 illustrates a system 100 for recycling databases and servers. As illustrated in FIG. 1, system 100 includes a user 105, device 110, network 115, middleware server 120, database 125 and recycling tool 130. For the purposes of clarity, only one middleware server 120 and database 125 are illustrated in FIG. 1. However, it is understood that system 100 can include any number of middleware servers 120 and databases 125. In particular embodiments, system 100 stops and restarts processes on middleware server 120 and database 125 in such a manner that reduces errors and security threats stemming from the stop and restart process.

Device 110 is any computing device capable of communicating over network 115. User 105 may use device 110 to initiate maintenance on middleware server 120 and database 125. This disclosure contemplates device(s) 110 being any appropriate device that can communicate over network 115. For example, device(s) 110 may be a computer, a laptop, a wireless or cellular telephone, an electronic notebook, a personal digital assistant, a tablet, a server, a mainframe, or any other device capable of receiving, processing, storing, and/or communicating information with other components of system 100. Device(s) 110 may also include a user interface, such as a display, a microphone, keypad, or other appropriate terminal equipment usable by a user. In some embodiments, an application executed by device(s) 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Middleware server 120 executes middleware used by other components of system 100. For example, middleware server 120 may provide drivers and libraries that are used by other components of system 100, such as device 110 and recycling tool 130. When executing these processes, middleware server 120 creates and executes middleware instances 150. This disclosure contemplates system 100 including any number of middleware servers 120 executing any number of middleware instances 150.

Database 125 stores data used by other components of system 100, such as device 110 and recycling tool 130. To maintain and allow access to the data, database 125 executes services 145. This disclosure contemplates system 100 including any number of databases 125 executing any number of services 145.

Middleware server 120 and database 125 should be maintained in order to increase their lifespan and to reduce the chances of security breaches. For example, middleware server 120 and database 125 should be patched and updated regularly to reduce the chance that middleware server 120 and database 125 are hacked and/or breached. During maintenance, certain middleware instances 150 and database services 145 are stopped. Then after maintenance is complete, these middleware instances 150 and database services 145 are restarted. This stop and restart process, when done manually, increases the chances of data corruption, errors, and security threats. For example, if one user 105 stops a middleware instance and then restarts that middleware instance, but during the restart, another user 105 stops the middleware instance, then such an overlap may lead to data and/or cache corruptions in middleware server 120. These data and cache corruptions could cause middleware server 120 to crash. As another example, if a user 105 stops a database service 145 and later forgets to restart that database service 145, then database 125 may be exposed to particular security threats especially if that database service is a security service. As yet another example, if a user stops a middleware instance 150 on middleware server 120, then that middleware server 120 may not be able to perform certain operations. As a result, other middleware servers 120 and system 100 may be tasked with performing those operations. This shifting of tasks may lead to unbalanced loads in other middleware servers 120, which could cause them to crash.

This disclosure contemplates using recycling tool 130 to ameliorate some of the issues caused by the stop and restart process. Recycling tool 130 recycles middleware server 120 and database 125 during maintenance. As illustrated, recycling tool 130 includes processor 135 and memory 140. This disclosure contemplates processor 135 and memory 140 being configured to perform any of the functions of recycling tool 130 described herein. In particular embodiments, by using recycling tool 130 the chance of data corruption and errors during the stop and restart process is reduced. Furthermore, security threats introduced by the stop and start process may be avoided.

Processor 135 is any electronic circuitry, including, but not limited to microprocessors, application specific integrated circuits (ASIC), application specific instruction set processor (ASIP), and/or state machines, that communicatively couples to memory 140 and controls the operation of recycling tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of recycling tool 130 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Recycling tool 130 monitors for maintenance windows. When a user 105 initiates a maintenance window, recycling tool 130 may execute scripts, such as a stop script, to stop middleware instances 150 and database services 145 that should be stopped. Then after the maintenance window is complete, recycling tool 130 may execute a restart script to restart the middleware instances 150 and databases services 145 that were stopped. In this manner, middleware instances 150 and databases processes 145 that were stopped are restarted. Furthermore, data corruptions, errors and security threats may be minimalized.

FIG. 2 illustrates the recycling tool 130 of the system 100 of FIG. 1. As illustrated in FIG. 2, recycling tool 130 includes memory 140, a monitoring engine 200, a script execution engine 205, a status check engine 210 and a communication engine 215.

Memory 140 stores a stop script 220 and a start script 225. In particular embodiments, by executing stop script 220, certain middleware instances and database services are stopped prior to maintenance. Then, by executing start script 225, these middleware instances and database services are restarted. In certain embodiments start script 225 may also be referred to as a restart script.

Monitoring engine 200 monitors for maintenance windows. Monitoring engine 200 may receive a request 230 indicating the beginning of maintenance. For example, a user 105 or a device 110 of system 100 may initiate maintenance and device 110 may communicate request 230 to recycling tool 130 in response to initiating maintenance. In response to receiving request 230, recycling tool 130 may prepare middleware servers and databases in system 100 for maintenance. An example algorithm that monitoring engine 200 can follow is as follows: monitoring engine 200 can wait for request 230; when request 230 arrives at monitoring engine 200, monitoring engine can detect a receiving event; in response to detecting the receiving event, monitoring engine 200 can retrieve request 230 from a message queue.

Script execution engine 205 executes stop script 220 in response to receiving request 230. Stop script 220 may indicate the middleware instances and database services that should be stopped before maintenance begins. By executing stop script 220, script execution engine 205 may identify the middleware instances that should be stopped. For example, script execution engine 205 may identify a first middleware instance executing on a first middleware server and a second middleware instance executing on a second middleware server. Script execution engine 205 may then stop the first middleware instance and the second middleware instance on the first middleware server in the second middleware server. An example algorithm that script execution engine 205 may follow to identify the middleware instances and to stop them is as follows: Script execution engine 205 may scan stop script 220; stop script 220 may identify the names and/or IDs of middleware instances that should be stopped before maintenance begins; script execution engine 205 may identify these instances and then issue commands to various middleware servers to stop the middleware instances with the names and/or IDs listed in stop script 220; in response to receiving these commands, the middleware servers may stop these middleware instances.

Script execution engine 205 also identifies and stops database processes executing on database servers. Script execution engine 205 may take snapshots of the database servers to identify which processes are executing on the database servers. Then, script execution engine 205 may stop the processes executing on the database servers based on the snapshots. An example algorithm that script execution engine 205 may use to identify and stop database processes is as follows: Script execution engine 205 may issue a command for a database server to return the names and/or IDs of executing processes on the database; script execution engine 205 may receive that list and identify the processes executing on the database; script execution engine 205 may then issue commands to the databases to stop the processes that are executing on the databases; in response, the databases may stop executing the processes.

Status check engine 210 monitors the status of middleware servers, databases and maintenance. For example, status check engine 210 may monitor when maintenance begins and when maintenance is complete. An example algorithm for status check engine 210 to monitor the status of maintenance is as follows: Status check engine 210 may receive a message from a user indicating that maintenance is beginning; status check engine 210 may then monitor databases and middleware servers in system 100 to determine whether maintenance is complete on those databases or middleware servers (for example, status check engine 210 may monitor whether a patch or software update has finished installing on the databases or middleware servers. As another example, status check engine 210 may monitor whether an update process has finished executing on the databases and middleware servers.); when maintenance is complete, status check engine 210 may register that maintenance is completed.

In response to status check engine 210 determining that maintenance is completed, script execution engine 205 may execute the start script 225. By executing start script 225, script execution engine 205 may restart the middleware instances and the databases services that were stopped. An example algorithm for identifying and restarting the middleware instances and database servers is as follows: Script execution engine 205 may identify the middleware instances that should be restarted based on start script 225 (For example, start script 225 may identify the middleware instances that should be restarted after maintenance is complete.); script execution engine 205 may then issue commands to middleware servers to restart those middleware instances; in response to those commands, the middleware servers can restart those middleware instances; script execution engine 205 can also examine the snapshots that were taken when executing stop script 220 to identify the database services that were stopped before maintenance; script execution engine 205 may then issue commands to the databases to restart those database services (For example, when executing stop script 220 the databases may have returned to script execution engine 205 lists of services that were executing on the databases. Script execution engine 205 may look to those lists again when executing start script 225 to identify the database services that should be restarted.)

Communication engine 215 notifies a user or device of the stop and restart process. Communication engine 215 may generate and communicate a message 235 if an error occurred during the start/stop process. For example, message 235 may indicate whether a middleware instances or database service failed to stop or failed to restart. As another example, message 235 may indicate whether an error occurred during maintenance. An algorithm for communication engine 215 is as follows: Status check engine 210 may monitor whether a middleware instance or database service failed to stop or restart; (if status check engine 210 determines that a middleware instance or database service failed to stop or restart, status check engine 210 may communicate a command to communication engine 215 indicating that the middleware instance or database service failed to restart; in response to receiving that command, communication engine 215 may create message 235; communication engine 215 may create message 235 by clearing sufficient space in memory 140 to create message 235; communication engine 215 may append data to message 235 indicating that the middleware instance or the database service failed to stop or restart; communication engine 215 may then communicate message 235 to a user or device.

In particular embodiments, by using recycling tool 130, the stop/start process may be performed without error. For example, recycling tool 130 may ensure that all stopped middleware instances and database services are restarted. Furthermore, recycling tool 130 may eliminate overlapping start processes that cause data corruptions and errors. Additionally, recycling tool 130 may prevent crashes by preventing unbalanced loads during the stop/start process. Moreover, recycling tool 130 may reduce the security risks that arises during the stop/start process.

In particular embodiments, status check engine 210 can determine whether a middleware instance or database service has stopped or restarted. An example algorithm for status check engine 210 is as follows: Status check engine 210 may issue a command to stop a middleware instance or database service on the middleware server or database; status check engine 210 may then issue a command to the middleware server or database periodically to return the names and IDs of executing middleware instances and database services; the middleware server and database may then periodically return a list of executing middleware instances and database services; based on that list, status check engine 210 may determine whether the middleware instance or database service is executing; if the list does not identify the middleware instance or database service, status check engine 210 may determine that the middleware instance or database service is no longer executing; if the list identifies the middleware instance or database service, status check engine 210 may determine that the middleware instance or database service is executing.

In particular embodiments, start script 225 may indicate an order of restart. For example, start script 225 may indicate that middleware instances and database services should be restarted in the reverse order in which they were stopped. So if middleware instances were stopped before database services, then start script 225 may indicate that database services should be restarted before middleware instances. As a result, script execution engine 205 may issue commands to first restart the database services that were last stopped. When status check engine 210 confirms that those database services have been started, script execution engine 205 may then issue commands to restart the middleware instances in the reverse order in which they were stopped. In certain embodiments, by restarting the middleware instances and database services in reverse order the databases and middleware servers may avoid crashes and/or errors during restart.

In particular embodiments, status check engine 210 may ensure that the middleware instances and database services that should be stopped, have stopped before allowing maintenance to continue. An example algorithm for status check engine 210 is as follows: Status check engine 210 may issue commands to the middleware servers and databases to return a list of middleware instances and database services that are executing on the middleware servers and databases; status check engine 210 may examine these lists to determine whether the middleware instances and database services that should be stopped have stopped; once status check engine 210 determines that the middleware instances and database services have stopped, status check engine 210 may issue a notification indicating that maintenance can begin; communication engine 215 may communicate the indication to other components of system 100.

In particular embodiments, recycling tool 130 restarts only middleware instances and databases services that were executing before maintenance began. For example, script execution engine 205 may identify the middleware instances and database services that should be stopped when executing stop script 220. Script execution engine 205 may track the middleware instances and database services that were stopped in response to receiving request 230. When status check engine 210 indicates that maintenance is complete, script execution engine 205 may then issue commands to restart only those middleware instances and database services that were stopped in response to receiving request 230.

In particular embodiments, recycling tool 130 may identify the middleware instances and databases services that should be stopped and restarted base on a version of the middleware server or database. For example, when script execution engine 205 executes stop script 220, script execute engine 205 may issue a command to the middleware servers and databases to return their version numbers. Based on these version numbers, script execution engine 205 may then identify the middleware instances and database services that should be stopped before maintenance begins. In certain embodiments, script execution engine 205 may identify these middleware instances and database services based on stop script 220. In this manner, script execution engine 205 may be adapted to handle various middleware servers and databases of various version.

FIG. 3 is a flowchart illustrating a method 300 for recycling databases and servers using the system of FIG. 1. In particular embodiments, recycling tool 130 performs method 100. By performing method 300, recycling tool 130 reduces the security threat posed by the start/stop process. Additionally, recycling tool 130 reduces the chances of error and/or data corruption during the start/stop process.

Recycling tool 130 begins by receiving a request to begin maintenance in step 305. In response to receiving this request recycling tool 130 executes a stop script in step 310. In step 315, recycling tool 130 identifies a first middleware instance on a first middleware server. Recycling tool 130 then stops the first middleware instance in step 320. In step 325, recycling tool 130 identifies a second middleware instance on a second middleware server. Then in step 330, recycling tool 130 stops the second middleware instance.

Recycling tool 130 then takes a snapshot of a first database and a snapshot of a second database. The snapshots may identify the database services that are executing on the first database and the second database. Then in step 340, recycling tool 130 stops a first service on the first database and a second service on the second database.

In step 345, recycling tool 130 determines whether maintenance is complete. If maintenance is not complete, recycling tool 130 continues to monitor maintenance. When maintenance is complete, recycling tool 130 executes a restart script in step 350. Then in step 355, recycling tool 130 restarts the first middleware instance on the first middleware server, the second middleware instance on the second middleware servers, the first service on the first database and the second service on the second database.

Modifications, additions, or omissions may be made to method 300 depicted in FIG. 3. Method 300 may include more, fewer, or other steps. For example, steps may be performed in parallel or in any suitable order. For example, restarting middleware instances can occur before restarting database services, and vice versa. While discussed as recycling tool 130 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A recycling tool comprising:
   a memory configured to store a stop script and a restart script;
   a monitoring engine configured to receive a request to begin maintenance;
   a script execution engine configured to execute the stop script in response to receiving the request, wherein executing the stop script causes the script execution engine to:
      identify a first middleware instance executing on a first middleware server;
      attempt to stop the first middleware instance;
      identify a second middleware instance executing on a second middleware server;
      attempt to stop the second middleware instance;
      take a first snapshot of a first database, wherein the first snapshot identifies a first service running on the first database;
      attempt to stop the first service;
      take a second snapshot of a second database, wherein the second snapshot identifies a second service running on the second database; and
      attempt to stop the second service; and
   a status check engine configured to determine that maintenance has completed, wherein the script execution engine executes the restart script in response to the determination that maintenance has completed, wherein executing the restart script causes the script execution engine to:
      determine, based on the first snapshot, that the first service should be restarted on the first database;
      in response to the determination that the first service should be restarted on the first database, restart the first service on the first database;
      determine, based on the second snapshot, that the second service should be restarted on the second database;
      in response to the determination that the second service should be restarted on the second database, restart the second service on the second database;
      restart the first middleware instance on the first middleware server; and
      restart the second middleware instance on the second middleware server.

2. The recycling tool of claim 1, wherein the status check engine is further configured to:
   determine that the first service has restarted on the first database; and
   determine that the second service has restarted on the second database.

3. The recycling tool of claim 1, wherein the status check engine is further configured to determine that the first and second services and the first and second middleware instances have stopped before maintenance begins.

4. The recycling tool of claim 1, wherein executing the restart script further causes the script execution engine to:

restart the second service on the second database before restarting the first service on the first database;

restart the first service on the first database before restarting the second middleware instance on the second middleware server; and restart the second middleware instance on the second middleware server before restarting the first middleware instance on the first middleware server.

5. The recycling tool of claim 4, wherein executing the restart script further causes the script execution engine to:

restart a third middleware instance on a third middleware server only if the third middleware instance was executing on the third middleware server when the request to begin maintenance was received; and restart a third service on a third database only if the third service was executing on the third database when the request to begin maintenance was received.

6. The recycling tool of claim 1, further comprising a communication engine configured to communicate an error message if one or more of the first middleware instance did not stop, the second middleware instance did not stop, the first service did not stop, the second service did not stop, the first middleware instance did not restart, the second middleware instance did not restart, the first service did not restart, and the second service did not restart.

7. The recycling tool of claim 1, wherein executing the stop script and the restart script causes the script execution engine to:

identify a version of a third middleware server;

identify a version of a third database;

determine, based on the version of the third middleware server, a third middleware instance that should be stopped before maintenance begins;

in response to the determination that the third middleware instance should be stopped before maintenance begins, stop the third middleware instance on the third middleware server;

restart the third middleware instance on the third middleware server after maintenance is complete;

determine, based on the version of the third database, a third service that should be stopped before maintenance begins;

in response to the determination that the third service should be stopped before maintenance begins, stop the third service on the third database; and restart the third service on the third database after maintenance is complete.

8. A method comprising:

storing a stop script and a restart script;

receiving a request to begin maintenance;

executing the stop script in response to receiving the request;

identifying a first middleware instance executing on a first middleware server;

attempting to stop the first middleware instance;

identifying a second middleware instance executing on a second middleware server;

attempting to stop the second middleware instance;

taking a first snapshot of a first database, wherein the first snapshot identifies a first service running on the first database;

attempting to stop the first service;

taking a second snapshot of a second database, wherein the second snapshot identifies a second service running on the second database;

attempting to stop the second service;

determining that maintenance has completed;

executing the restart script in response to the determination that maintenance has completed;

determining, based on the first snapshot, that the first service should be restarted on the first database;

in response to the determination that the first service should be restarted on the first database, restarting the first service on the first database;

determining, based on the second snapshot, that the second service should be restarted on the second database;

in response to the determination that the second service should be restarted on the second database, restarting the second service on the second database;

restarting the first middleware instance on the first middleware server; and restarting the second middleware instance on the second middleware server.

9. The method of claim 8, further comprising:

determining that the first service has restarted on the first database; and determining that the second service has restarted on the second database.

10. The method of claim 8, further comprising determining that the first and second services and the first and second middleware instances have stopped before maintenance begins.

11. The method of claim 8, further comprising:

restarting the second service on the second database before restarting the first service on the first database;

restarting the first service on the first database before restarting the second middleware instance on the second middleware server; and restarting the second middleware instance on the second middleware server before restarting the first middleware instance on the first middleware server.

12. The method of claim 11, further comprising:

restarting a third middleware instance on a third middleware server only if the third middleware instance was executing on the third middleware server when the request to begin maintenance was received; and restarting a third service on a third database only if the third service was executing on the third database when the request to begin maintenance was received.

13. The method of claim 8, further comprising communicating an error message if one or more of the first middleware instance did not stop, the second middleware instance did not stop, the first service did not stop, the second service did not stop, the first middleware instance did not restart, the second middleware instance did not restart, the first service did not restart, and the second service did not restart.

14. The method of claim 8, further comprising:

identifying a version of a third middleware server;

identifying a version of a third database;

determining, based on the version of the third middleware server, a third middleware instance that should be stopped before maintenance begins;

in response to the determination that the third middleware instance should be stopped before maintenance begins, stopping the third middleware instance on the third middleware server;

restarting the third middleware instance on the third middleware server after maintenance is complete;

determining, based on the version of the third database, a third service that should be stopped before maintenance begins;

in response to the determination that the third service should be stopped before maintenance begins, stopping the third service on the third database; and restarting the third service on the third database after maintenance is complete.

15. A system comprising:

a device;

a first database and a second database communicatively coupled to the device;

a first middleware server and a second middleware server communicatively coupled to the device; and a recycling tool communicatively coupled to the device, the recycling tool configured to:

store a stop script and a restart script;

receive a request to begin maintenance from the device;

execute the stop script in response to receiving the request;

identify a first middleware instance executing on the first middleware server;

attempt to stop the first middleware instance;

identify a second middleware instance executing on the second middleware server;

attempt to stop the second middleware instance;

take a first snapshot of the first database, wherein the first snapshot identifies a first service running on the first database;

attempt to stop the first service;

take a second snapshot of the second database, wherein the second snapshot identifies a second service running on the second database;

attempt to stop the second service; and determine that maintenance has completed;

execute the restart script in response to the determination that maintenance has completed;

determine, based on the first snapshot, that the first service should be restarted on the first database;

in response to the determination that the first service should be restarted on the first database, restart the first service on the first database;

determine, based on the second snapshot, that the second service should be restarted on the second database; and in response to the determination that the second service should be restarted on the second database, restart the second service on the second database;

restart the first middleware instance on the first middleware server; and restart the second middleware instance on the second middleware server.

16. The system of claim 15, wherein the recycling tool is further configured to:

determine that the first service has restarted on the first database; and determine that the second service has restarted on the second database.

17. The system of claim 15, wherein the recycling tool is further configured to determine that the first and second services and the first and second middleware instances have stopped before maintenance begins.

18. The system of claim 15, wherein the recycling tool is further configured to:

restart the second service on the second database before restarting the first service on the first database;

restart the first service on the first database before restarting the second middleware instance on the second middleware server; and restart the second middleware instance on the second middleware server before restarting the first middleware instance on the first middleware server.

19. The system of claim 18, wherein the recycling tool is further configured to:

restart a third middleware instance on a third middleware server only if the third middleware instance was executing on the third middleware server when the request to begin maintenance was received; and restart a third service on a third database only if the third service was executing on the third database when the request to begin maintenance was received.

20. The system of claim 15, wherein the recycling tool is further configured to communicate an error message if one or more of the first middleware instance did not stop, the second middleware instance did not stop, the first service did not stop, the second service did not stop, the first middleware instance did not restart, the second middleware instance did not restart, the first service did not restart, and the second service did not restart.

21. The system of claim 15, wherein the recycling tool is further configured to:

identify a version of a third middleware server;

identify a version of a third database;

determine, based on the version of the third middleware server, a third middleware instance that should be stopped before maintenance begins;

in response to the determination that the third middleware instance should be stopped before maintenance begins, stop the third middleware instance on the third middleware server;

restart the third middleware instance on the third middleware server after maintenance is complete;

determine, based on the version of the third database, a third service that should be stopped before maintenance begins;

in response to the determination that the third service should be stopped before maintenance begins, stop the third service on the third database; and restart the third service on the third database after maintenance is complete.

* * * * *